(12) United States Patent
Avalle

(10) Patent No.: US 7,232,301 B2
(45) Date of Patent: Jun. 19, 2007

(54) MACHINE FOR THE MANUFACTURE OF FLEXIBLE MOULDS, IN PARTICULAR FOR THE OBTAINMENT OF LIPSTICKS OR THE LIKE

(75) Inventor: Nadia Avalle, Vallese (CH)

(73) Assignee: Intercos S.p.A. (IT)

( * ) Notice: Subject to any disclaimer, the term of this patent is extended or adjusted under 35 U.S.C. 154(b) by 435 days.

(21) Appl. No.: 10/833,519

(22) Filed: Apr. 28, 2004

(65) Prior Publication Data

US 2004/0219248 A1 Nov. 4, 2004

(30) Foreign Application Priority Data

Apr. 29, 2003 (IT) .......................... MI2003A0853

(51) Int. Cl.
*B29C 41/14* (2006.01)
*B29C 41/42* (2006.01)

(52) U.S. Cl. .................. 425/110; 425/116; 425/176; 425/177; 425/270; 425/416; 425/422; 264/219; 264/225

(58) Field of Classification Search ........ 425/110–117, 425/175–180, 412–423, 269–275; 264/219–220, 264/224–225

See application file for complete search history.

(56) References Cited

U.S. PATENT DOCUMENTS 3,758,250 A * 9/1973 Schuff ...................... 425/422
3,892,512 A * 7/1975 Diehl ......................... 425/437
4,571,320 A * 2/1986 Walker ....................... 425/139
4,969,811 A * 11/1990 Littleton ..................... 249/170
5,156,798 A * 10/1992 Bruning ...................... 425/182
5,435,715 A * 7/1995 Campbell ................... 425/576

FOREIGN PATENT DOCUMENTS

FR 2 443 324 7/1980
JP 2000-094470 * 4/2000

* cited by examiner

*Primary Examiner*—Yogendra N. Gupta
*Assistant Examiner*—Thu Khanh T. Nguyen
(74) *Attorney, Agent, or Firm*—Akerman Senterfitt

(57) ABSTRACT

A machine for the manufacture of flexible moulds is described, in particular for the obtainment of lipsticks or the like, which comprises a female mould including at least one moulding cavity fillable with a plastic fluid, a male mould including at least a male stem and means to insert said male stem into said cavity of the female mould after the same has been filled with said plastic fluid and to extract it from the same after a prefixed cooling period suitable to transform said fluid plastic into a flexible mould. In an embodiment thereof the machine comprises a revolving table in order to move in sequence said female mould and said male mould through a sequence of operating stations, a first station in which said plastic fluid is inserted into said cavity of the female mould while said male mould is removed from said female mould, a second station in which said male mould is brought near said female mould and locked on it so as to insert and to lock said male stem in said cavity filled with plastic fluid, a plurality of stations to cool said plastic fluid so as to transform it into a flexible mould, and a last station in which the male mould lifts up thus dragging with itself the flexible mould. An apparatus associated with said last station allows to pick up and to put in collection containers said flexible mould.

7 Claims, 15 Drawing Sheets

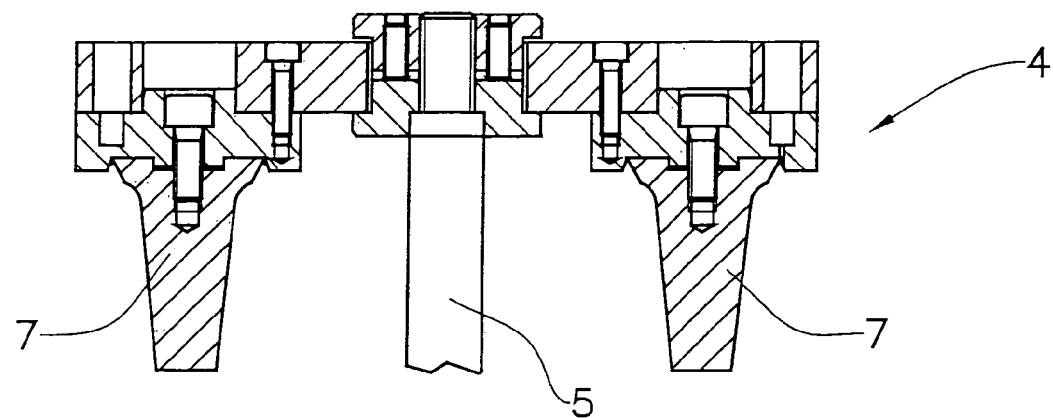
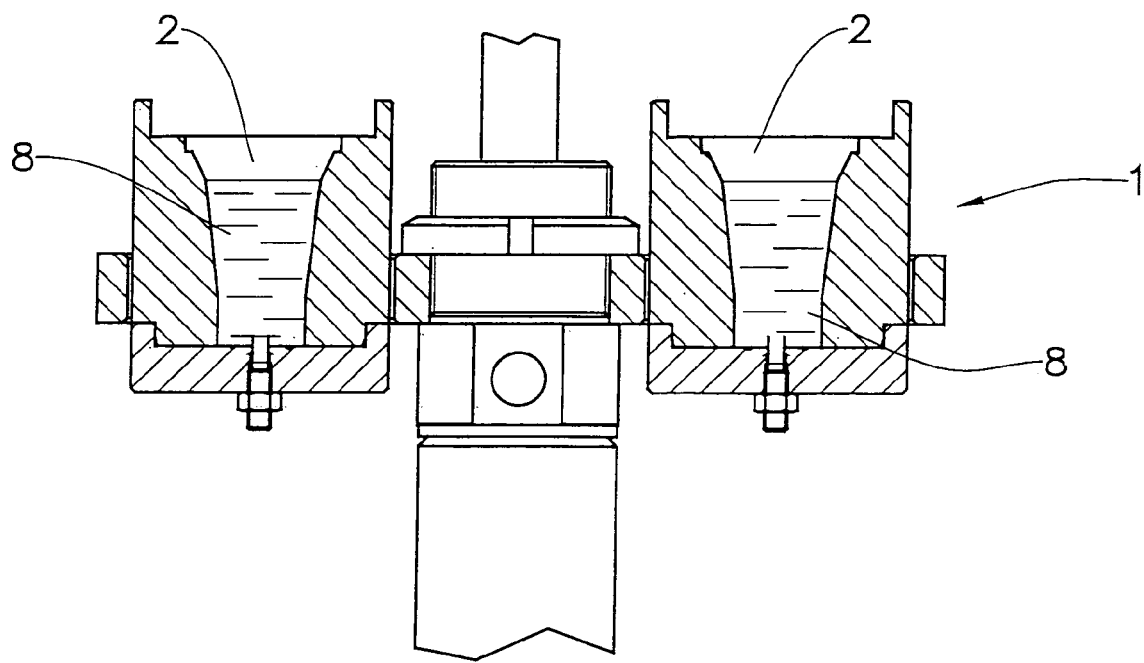
FIG.2

MACHINE FOR THE MANUFACTURE OF FLEXIBLE MOULDS, IN PARTICULAR FOR THE OBTAINMENT OF LIPSTICKS OR THE LIKE

The present invention concerns a machine for the manufacture of flexible moulds, in particular for the obtainment of lipsticks or the like.

A process has been known for a long time, in particular from FR-A-2443324, for the manufacture of lipsticks or similar cosmetic products, which provides the use of a flexible mould substantially shaped as a finger, that after opportune heating receives a pre-established quantity of cosmetic product in the molten state, which gets subsequently cooled until it assumes a solid shape. At this point at least one part of the flexible mould that is close to its filling mouth gets stretched by means of application of vacuum from the outside of it, through a flexible container shaped as a cup which surrounds the flexible mould, and a case for lipstick or the like is introduced into said stretched part in order to pick-up the solid cosmetic product, while the mould is kept in position, still by means of application of vacuum.

Object of the present invention is to build a machine capable to manufacture the aforesaid flexible moulds for lipsticks or the like.

According to the invention such object is attained with a machine characterised in that it comprises at least one female mould including a moulding cavity fillable with a plastic fluid, a male mould including at least a male stem and means to insert said male stem into said cavity of the female mould after the same has been filled with said plastic fluid and to extract it from the same after a prefixed period of polymerisation suitable to transform said fluid plastic into a flexible mould.

Two embodiments of the machine according to the present invention are illustrated as a non limiting example in the enclosed drawings, in which:

FIG. 2 shows a section according to the line II—II in FIG. 1 with plastic material in the fluid state poured into the moulding cavities;

Figure 1:
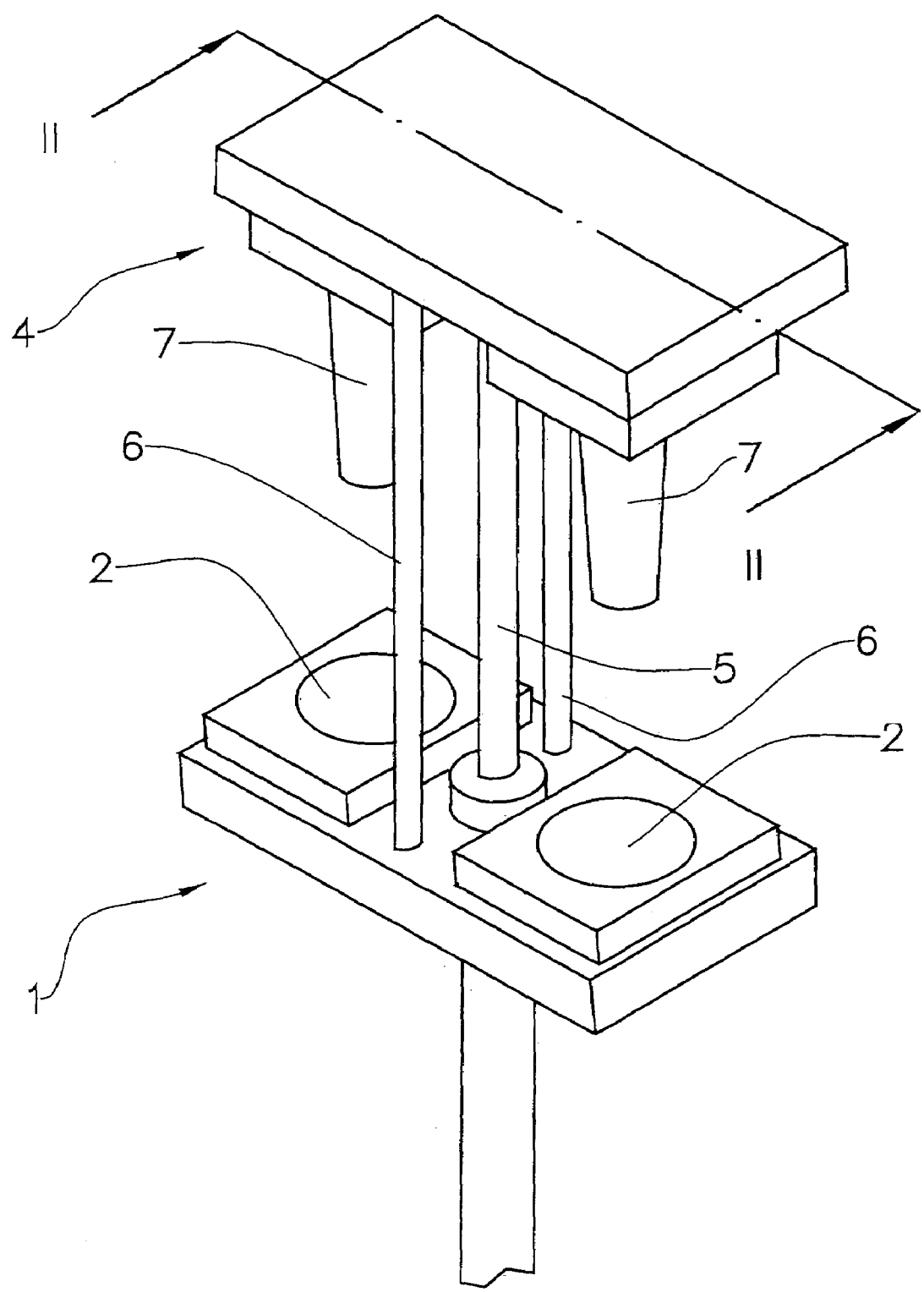
FIG. 1 shows an axonometry of a first machine according to the present invention.

The machine shown in FIGS. 1–5 comprises a female mould 1 including two moulding cavity 2 having truncated cone shape.

To such female mould 1 a male mould 4 is overlapped which is vertically mobile as regards the female mould 1 under the control of a rod 5 driven by a pneumatic cylinder 9 and guided by rods 6.

The male stem 4 is provided with truncated-cone shaped stems 7 destined to insert into cavities 2 when these have been filled with plastic material 8 in the liquid state (FIG. 2).

In the initial stage of its operating cycle the machine is in the condition of FIGS. 1 and 2, that is with the male mould 4 raised as compared with the female mould 1.

In such condition, through means not shown the plastic material 8 is poured, which therefore gets to fill the cavities 2.

Figure 3:
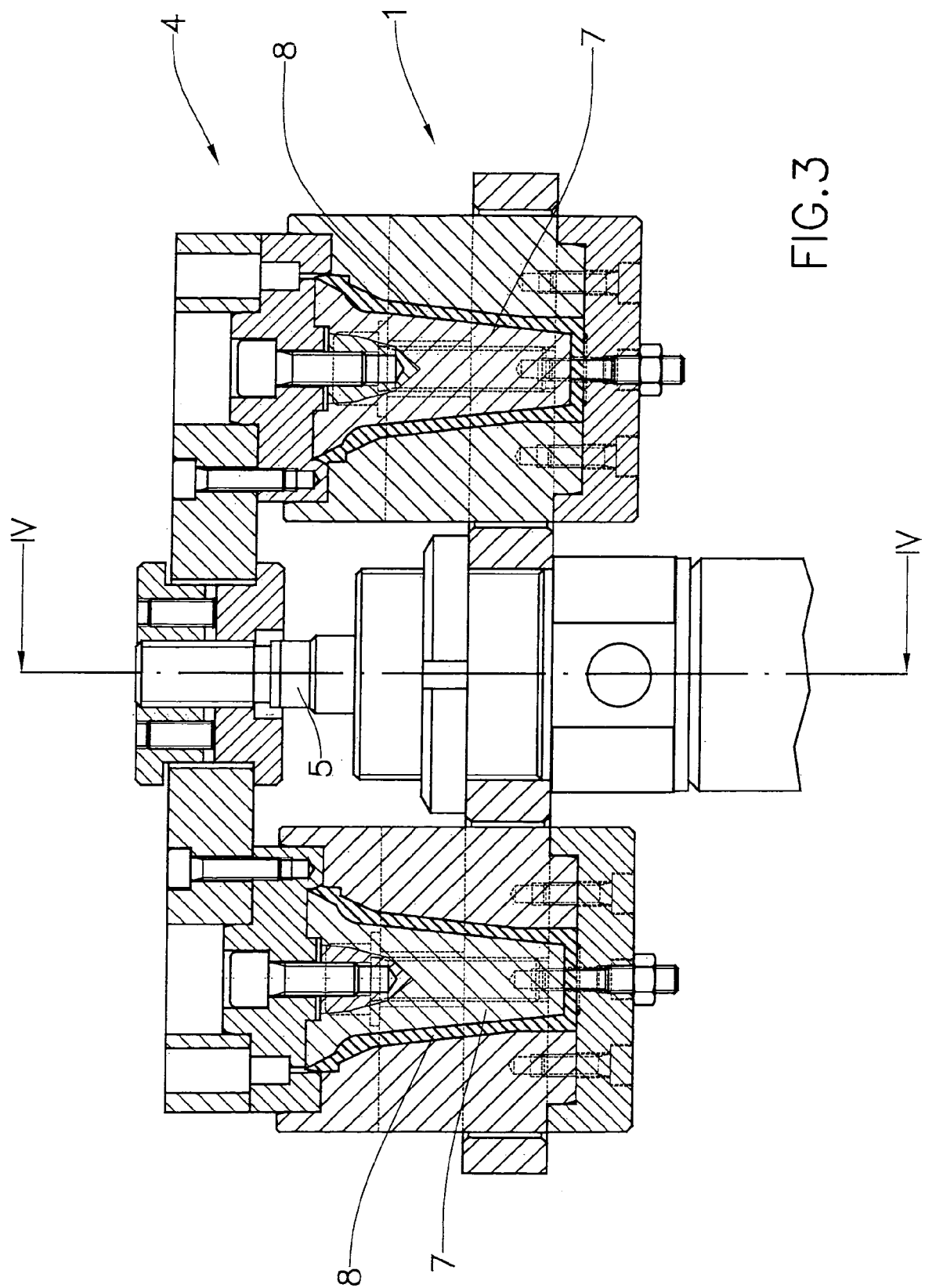
FIG. 3 shows a similarly sectioned magnified front view of the machine in FIG. 1, as seen in a subsequent operating stage.
Figure 4:
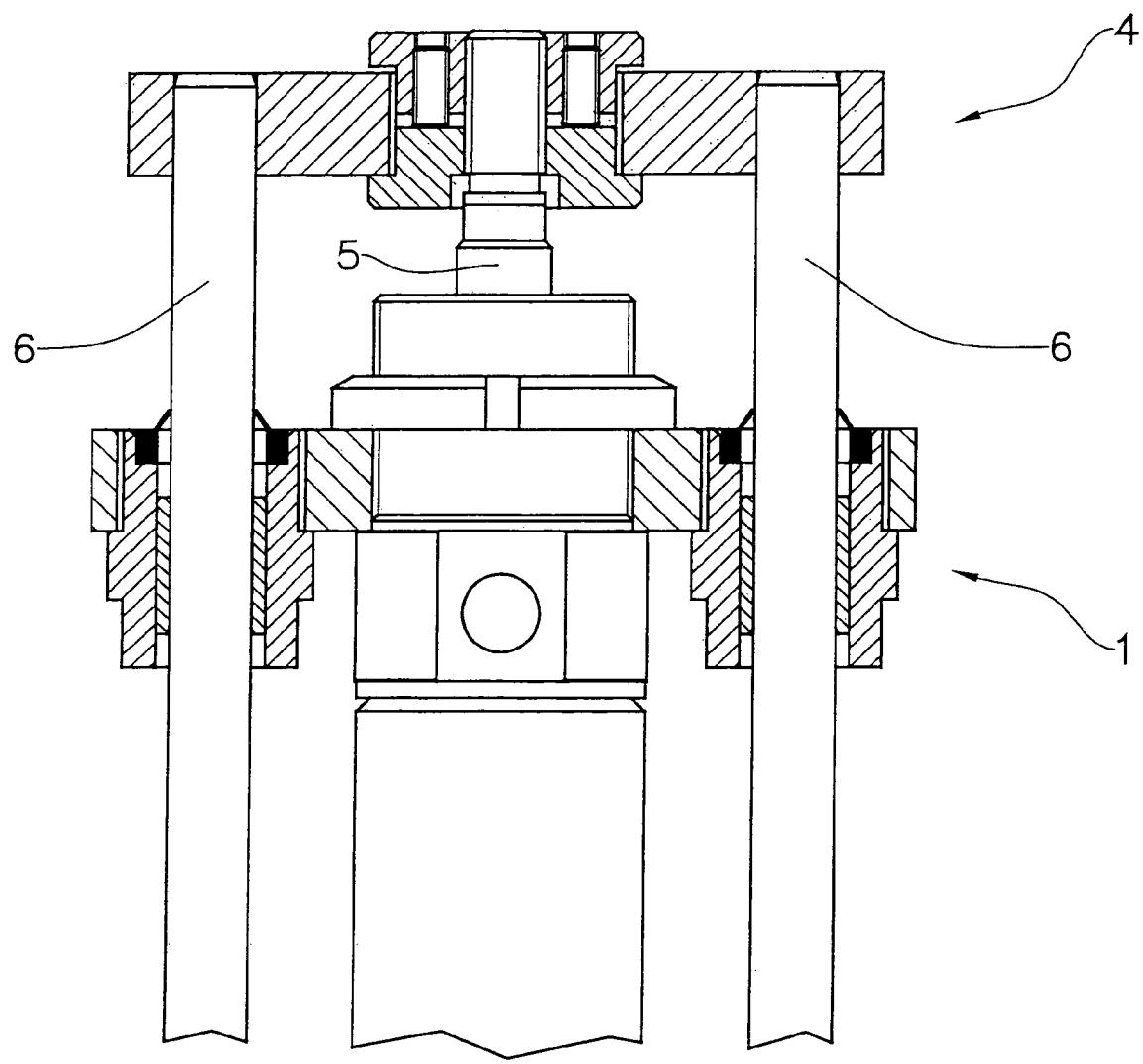
FIG. 4 shows a section according to line IV—IV in FIG. 3.
Figure 5:
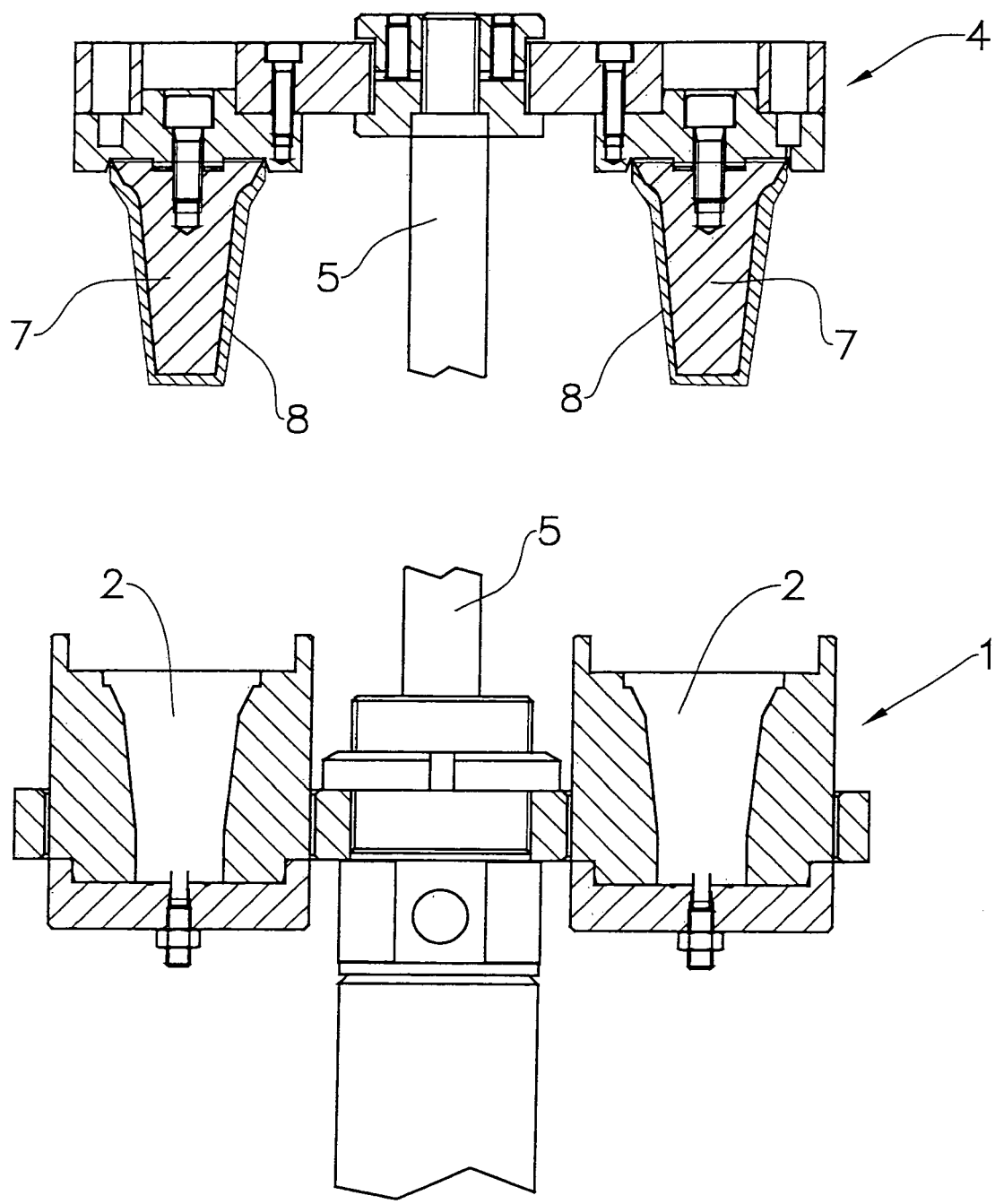
FIG. 5 shows a section similar to the one in FIG. 2 in a more subsequent operating stage.
Figure 6:
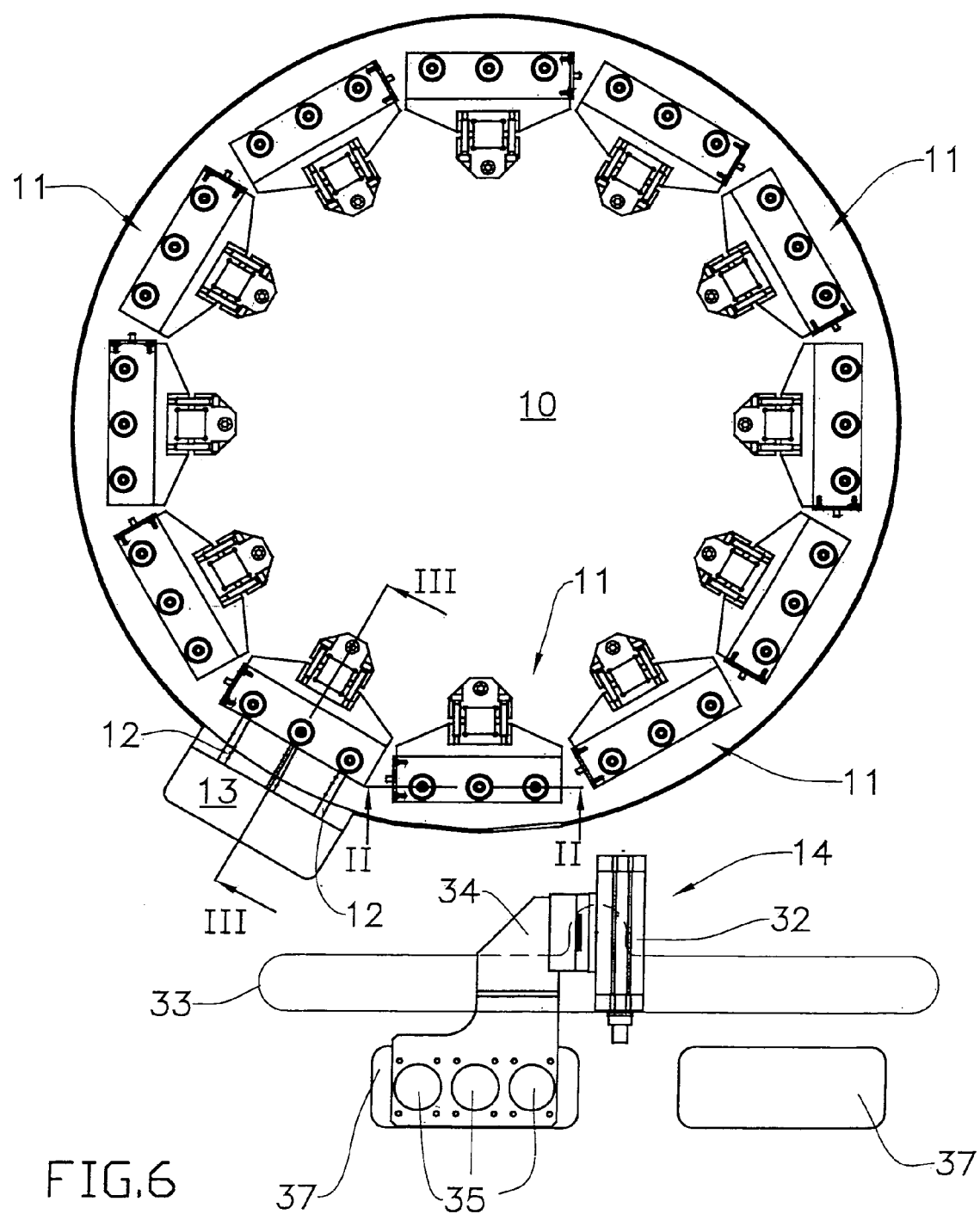
FIG. 6 shows a top plan view of a second machine according to the present invention.

In a subsequent operating stage, the male mould 4, driven by the stem 5, descends in such a way as to insert the stems 7 into the cavities 2 (FIGS. 3 and 4). The plastic material, still in the liquid state, occupies the free space between the stems 7 and the cavities 2.

Once it has been polymerised, the plastic material 8 forms a flexible container shaped as a cup, herein identified by the same number, which can be extracted from the cavity 2 owing to the lift of the male mould 4 back, as well as to remain inside the cavity 2 for the subsequent manual extraction.

In FIGS. 6–15 a subsequent machine according to the invention is shown, which is specifically provided for the formation of flexible containers usable as moulds for the production of lipsticks.

Figure 7:
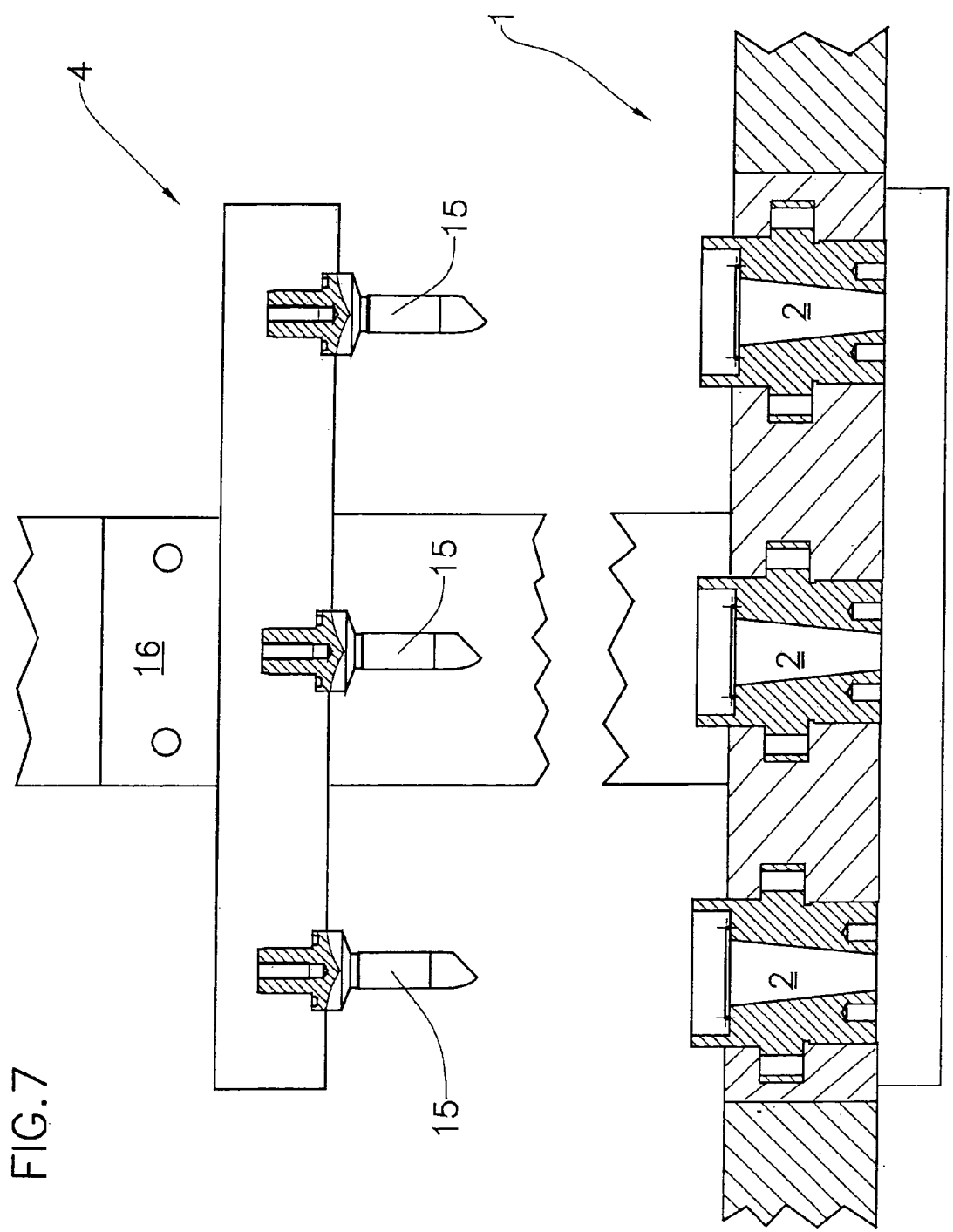
FIG. 7 shows a partial section of the machine according to line VII—VII in FIG. 6.

Said machine comprises (FIG. 6) a revolving round table 10, driven by means not shown in the figures, which supports a series of couplings 11 each one formed by a female mould 1 and a male mould 4 above it (FIG. 7). There is also provided on the side of the revolving table 10 a unit 13 for the feeding of plastic fluid 8 through small tubes 12. Finally there is provided an apparatus 14 for the picking up of the flexible containers 8.

In FIG. 7 it appears evident that each male mould 4 comprises three male stems 15 shaped as lipsticks, and that each female mould 1 comprises three truncated-cone shaped cavities 2.

The male mould 4 is supported (FIG. 8) by a bar 16 that moves vertically, owing to means not shown in the figures, along a guide 17 supported, through a body 18, by a frame 19, that is part of the revolving table 10, which also supports the female mould 1, under which there is a valve 20.

Said valve 20 comprises a body 21 having a cylindrical cavity within which a cap 22 thrust by a piston 23 biased by a spring 24 slides. The body 21 comprises a first channel 26 to which a second channel 27 couples that is obtained in a body 28, integral with said body 21, which allows the inlet of air supplied by means not shown in the figures.

When the stem 15 is lowered within the cavity 2 (FIG. 9), a mobile safety element 30, supported by a cylinder 31 fastened to the frame 19, allows to maintain the entire male mould 4 locked on the female mould 1.

The apparatus 14 for the picking up of the flexible containers 8, destined to fill cases 37, comprises a body 32, mobile along a guide 33 through a saddle 39 with which it is integral by means of a supporting unit 40. The body 32 supports a revolving arm 34 to which pick-up cups 35 are fastened which are obtained within an opportunely shaped block 36. A channel 38, contained in said block 36, allows the passage of a blow of air coming from means not shown in the figures.

Figure 8:
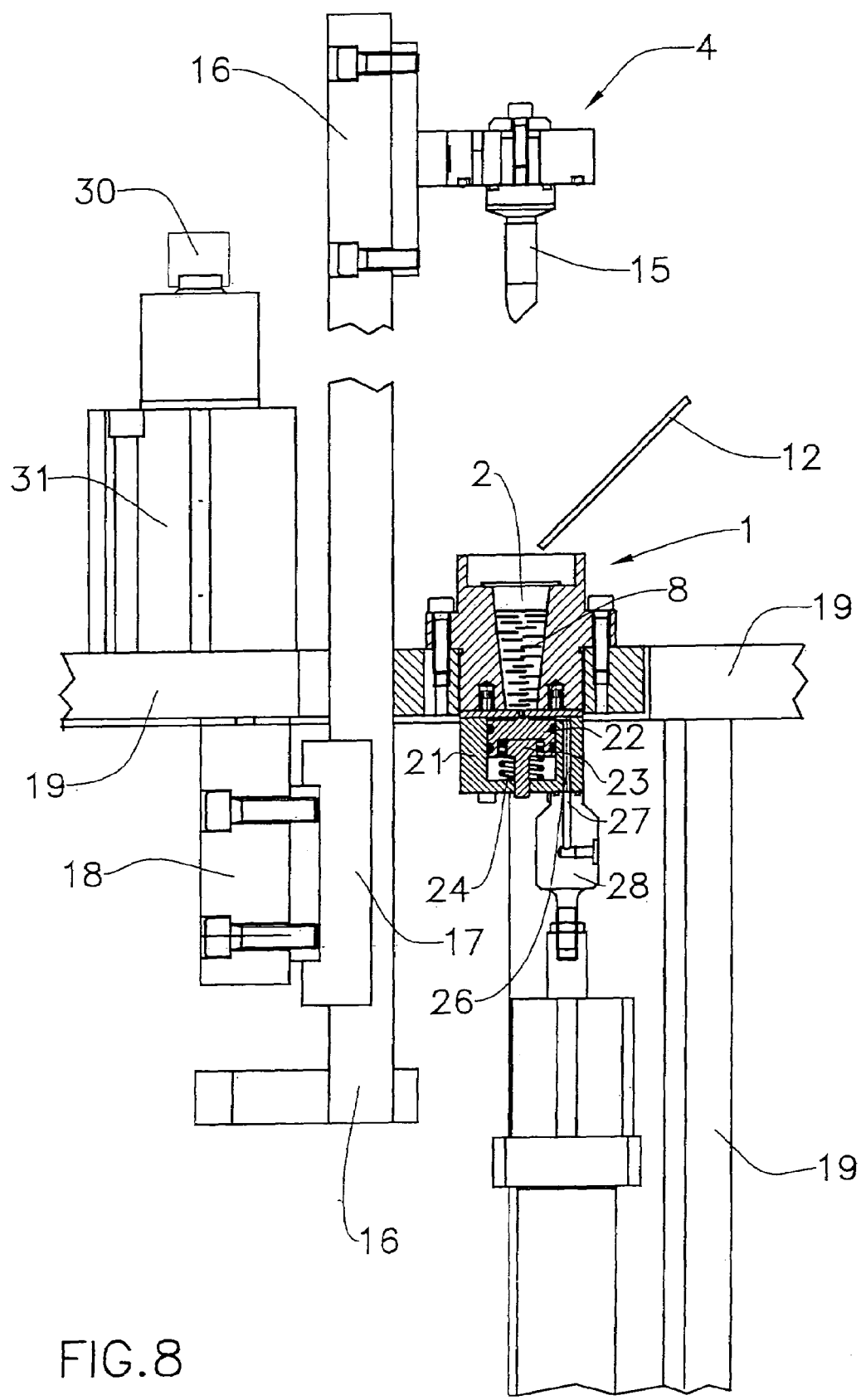
FIG. 8 shows a partial section of the machine according to line VIII—VIII in FIG. 6.
Figure 9:
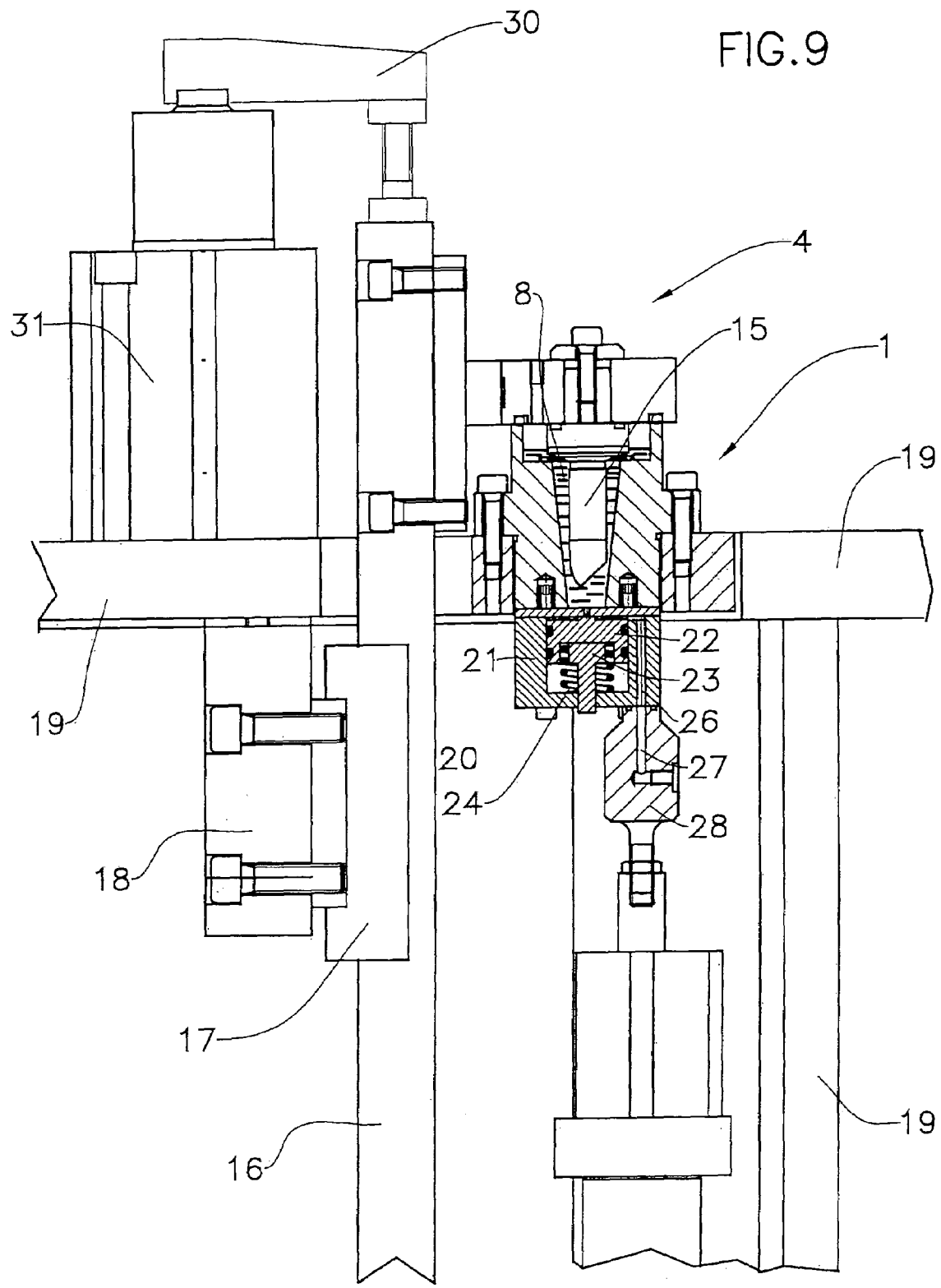
FIG. 9 shows a section of the machine similar to the one in FIG. 1 in a subsequent operating stage.
Figure 10:
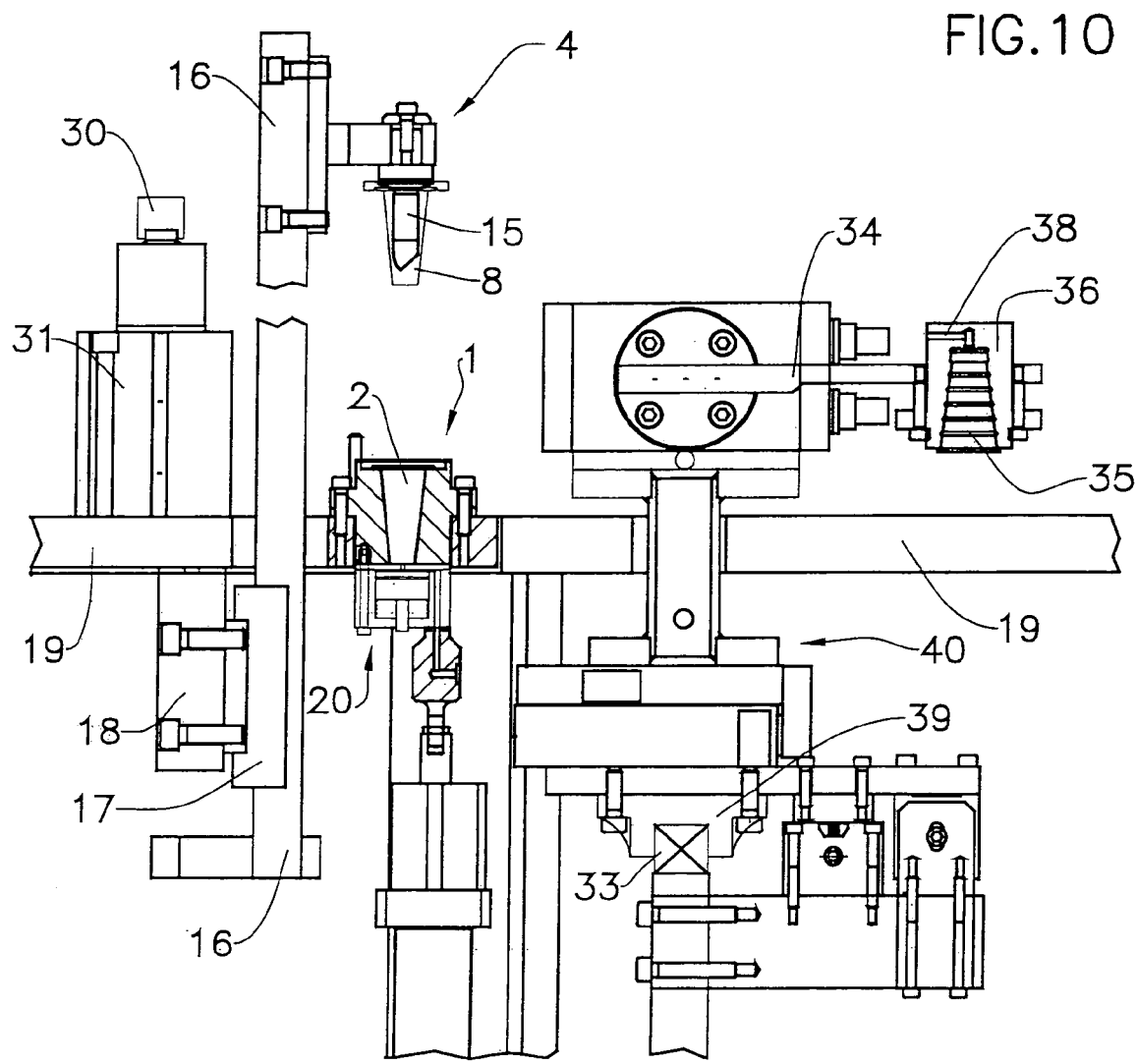
FIGS. 10 and 11 show similar sections of the machine in a further subsequent operating stages.

At the beginning of its operating cycle the machine is in front of the feeding unit 13 in the condition shown in FIG. 8, that is with the male mould 4 lifted up, the cavity 2 ready to be partially filled with plastic fluid 8 (in particular, a polymerisable silicon material at room temperature, as for example RTV 4010 A/B) and the valve 20 closed in virtue of the fact that the piston 23, by means of the spring 24, thrusts the cap 22.

Once the filling of the cavity 2 is finished, means not shown in the figures allow the descent (FIG. 9) of the male mould 4 until each stem 15 inserts into the respective cavity 2 thus causing a partial rise of the plastic fluid 8 which therefore assumes the final configuration suitable for a flexible mould for lipsticks.

In order to guarantee that the male mould 4 stays in position until the solidification of the plastic material 8, the mobile element 30 rotates in such a way to overlaps the bar 16 which supports the male mould 4 and to inhibit its possible lifting back. A small movement of the stem 15 as regards the female mould 1 would imply in fact shape defects in the container of solidified plastic material 8.

The cooling of the plastic material 8 takes place by polymerisation at room temperature during the rotation, by almost 360°, of the table 10, which finally takes the couplings 11 in front of the picking up apparatus 14 (FIG. 6), which in the meantime has been opportunely positioned by moving along the guide 33 controlled by means not shown in figure.

Once this position has been reached the mobile element 30, by means of simple rotation induced by the pneumatic cylinder 31, is displaced thus leaving the bar 16 free to go up. In this stage the stem 15 drags with it upward (FIG. 10) the plastic container 8 in virtue of the opening of the valve 20. A blow of air is in fact blown by external means through the channels 27 and 26 (FIG. 9) thus causing a pressure on the head of the cap 22 that is therefore thrust downward. This allows the air to reach the zone in which the container adheres to the walls of the cavity 2 thus facilitating its separation.

Figure 11:
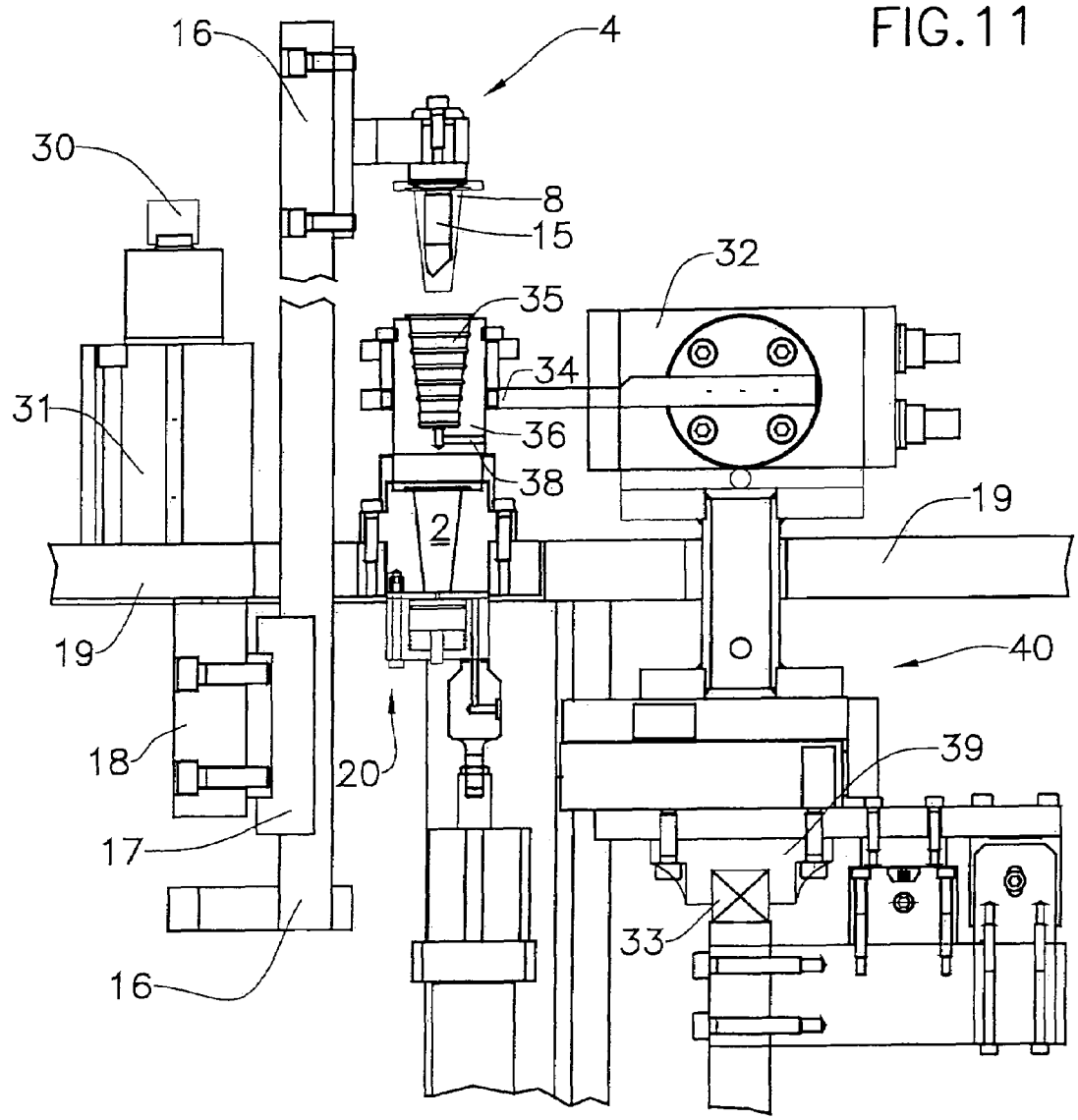
Figure 12:
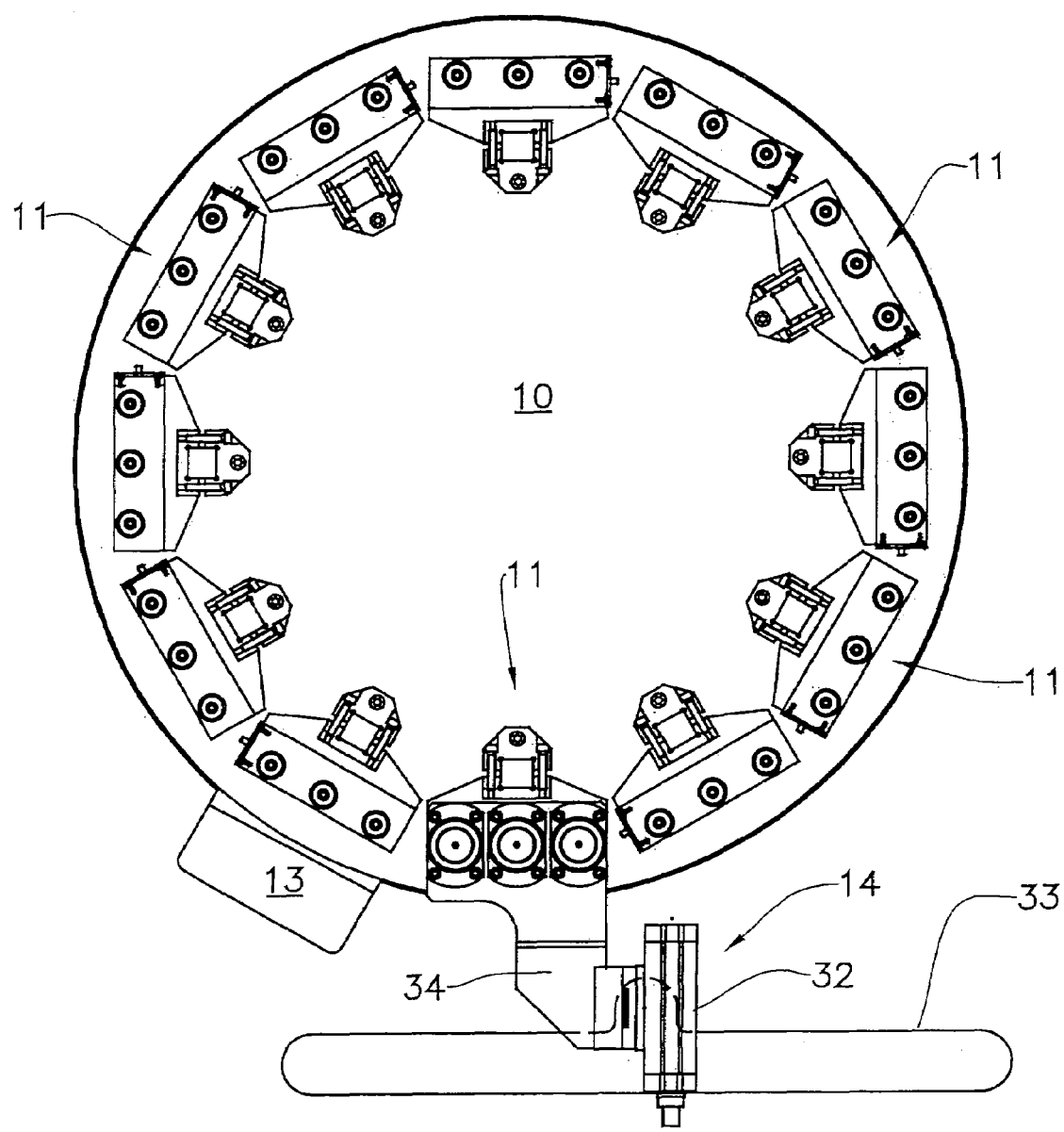
FIG. 12 shows a top plan view of the same machine in the operating stage of FIG. 11.

At this point the arm 34 rotates by 180° thus taking the cup 35 under the stem 15 to whose walls 8 the container adheres (FIGS. 11 and 12).

Figure 13:
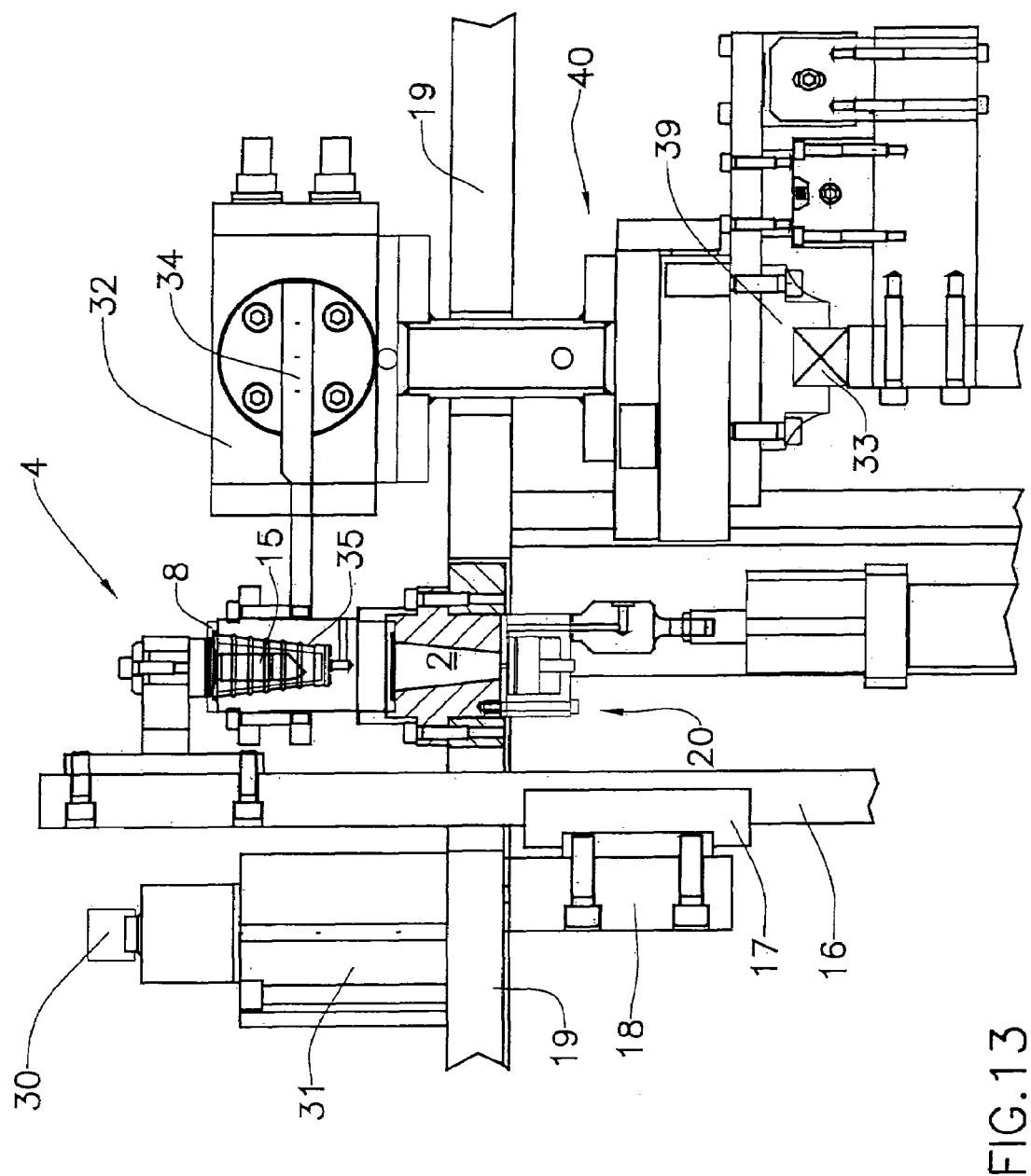
FIG. 13 shows a section of the machine similar to the ones in FIGS. 10 and 11 in an additional operating stage.
Figure 14:
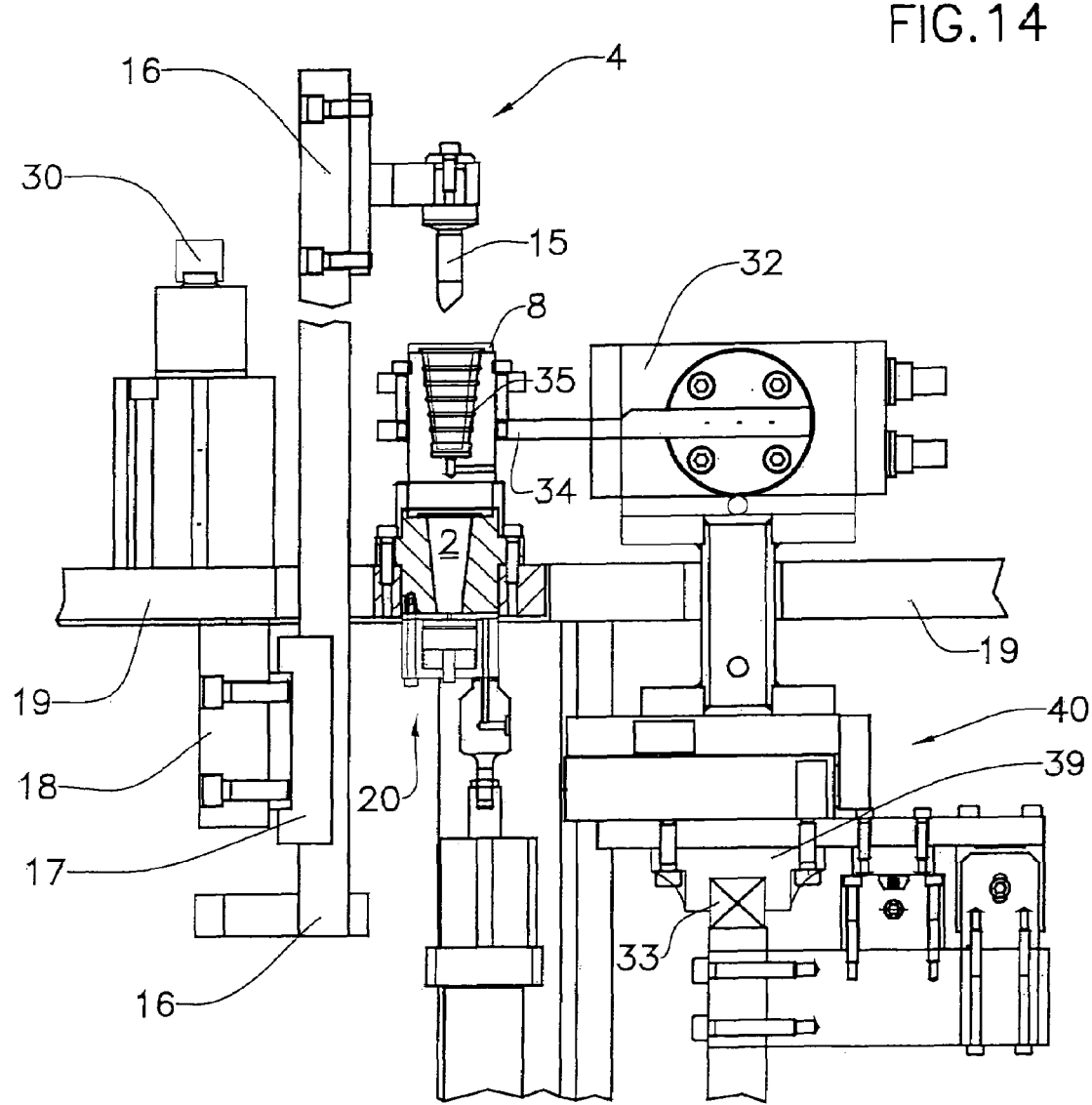
FIG. 14 shows a similar section of the machine in another additional operating stage.
Figure 15:
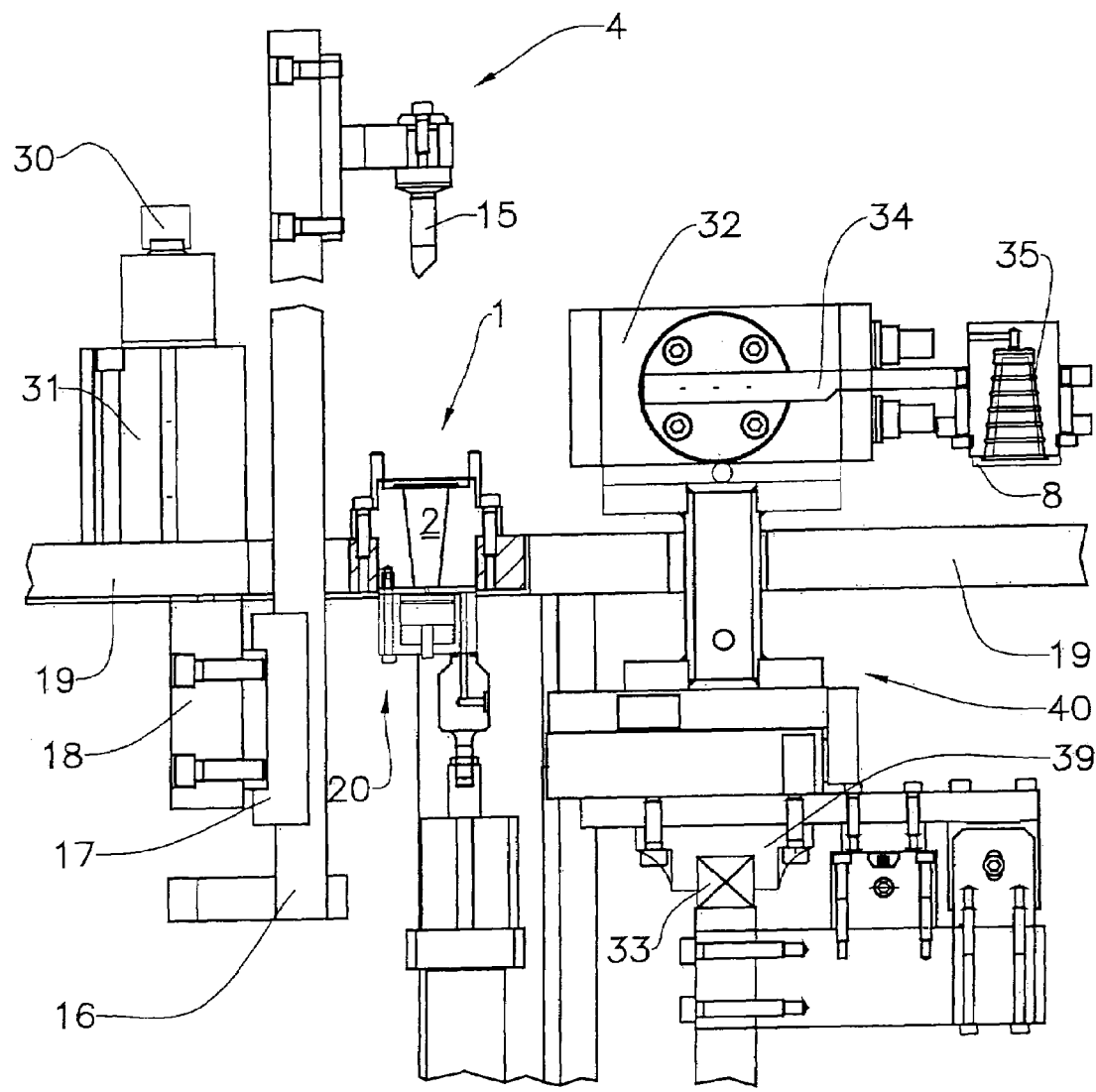
FIG. 15 shows a similar section of the machine at the end of its operating cycle.

In order to allow the container 8 to be picked up the male mould 4 descends in such way so as to bring the walls of the container 8 in contact with the walls of cup 35 (FIG. 13). Through the channel 38, by means of means not shown in the figures, the air is sucked so as to make the container 8 adhere to the walls of the cup 35. The male mould 4 can now lift back without dragging with it the container 8, which remains attached to the cup 35 (FIG. 14).

Finally the arm 34 rotates by 180° taking the cup 35 upside-down above one of the cases 37 (FIG. 15), where the container 8 falls by gravity, thrust by a blow of air that is blown through the channel 38, by external means not shown in the figures, in order to eliminate the adherence of the same container 8 to the walls of the cup 35.

The invention claimed is:

1. A machine for the manufacture of flexible molds for the obtainment of lipsticks or the like, comprising:
   a female mold including at least one molding cavity fillable with a plastic fluid;
   a male mold including at least one male stem and means to insert said male stem into said cavity of the female mold after the same has been filled with said plastic fluid and to extract it from the same after a prefixed period of cooling that is suitable to transform said fluid plastic into a flexible mold; and
   means to move said female mold and said male mold sequentially through a sequence of operating stations, comprising a revolving table provided with a circumferential sequence of female molds to which respective male molds are overlapped, said male molds being vertically mobile in relation to said female molds,
   wherein said operating stations are arranged adjacent to said revolving table and comprise
      a first station in which said fluid plastic is inserted into said cavity of the female mold while said male mold is separated from said female mold,
      a second station in which said male mold is brought near said female mold and locked on it so as to insert and to lock said male stem into said cavity filled with fluid plastic,
      a plurality of stations to allow the polymerization of said fluid plastic so as to transform it into a flexible mold, and
      a last station comprising means to lift the male mold up, thus dragging the flexible mold with the male mold, an apparatus being provided associated with said last station in order to pick un said flexible mold and to put said flexible mold into collection containers.

2. The machine according to claim 1, comprising a mobile element in order to lock the male mold in lowered position thus allowing the stem to stay still inside the cavity of the female mold.

3. The machine according to claim 1, wherein said last station comprises a valve suitable to allow ingress of air from the bottom of said cavity simultaneously to the lifting of the male mold so as to force the flexible mold to separate from the walls of said cavity and to remain attached to the male mold.

4. The machine according to claim 3, wherein said valve comprises a hollow body within which a mobile piston is housed that is thrust by a spring.

5. The machine according to claim 1, wherein said apparatus comprises a body that slides along a guide and an overturning arm within which at least one cup for the picking up of the flexible mold is obtained.

6. Machine according to claim 5, wherein said cup picks up the flexible molds from the stems by means of suction means.

7. Machine according to claim 5, wherein said cup is suppliable with a blow of air in order to force said flexible mold to abandon the cups and to fall by gravity into the collection containers.

\* \* \* \* \*